(12) United States Patent
Costner, III et al.

(10) Patent No.: US 12,434,650 B2
(45) Date of Patent: Oct. 7, 2025

(54) ROLLOVER PROTECTION STRUCTURE

(71) Applicant: Caterpillar Inc., Peoria, IL (US)

(72) Inventors: James D. Costner, III, Decatur, IL (US); Scott M. Shaffer, Tucson, AZ (US); Paul Ives, Twin Lake, MI (US); Ashraf I. S. Idkaidek, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 410 days.

(21) Appl. No.: 17/985,744

(22) Filed: Nov. 11, 2022

(65) Prior Publication Data

US 2024/0157903 A1 May 16, 2024

(51) Int. Cl.
*B60R 21/13* (2006.01)

(52) U.S. Cl.
CPC .................. *B60R 21/131* (2013.01)

(58) Field of Classification Search
CPC ....... B60R 21/11; B60R 21/13; B60R 21/131; E02F 9/0833; E02F 9/163; B62D 27/06; B62D 21/186; B62D 33/0617; B62D 33/08; B62D 25/081; B62D 25/082; E21C 35/04
See application file for complete search history.

(56) References Cited

U.S. PATENT DOCUMENTS

| | | | |
|---|---|---|---|
| 1,273,800 A * | 7/1918 | Aizenman | B60R 21/131 |
| | | | 296/68.1 |
| 2,935,277 A * | 5/1960 | Lucien | B64C 25/12 |
| | | | 244/102 R |
| 3,768,856 A * | 10/1973 | Stuller | B60R 21/11 |
| | | | 280/756 |
| 4,877,265 A | 10/1989 | DeBraal et al. | |
| 5,205,667 A * | 4/1993 | Montgomery, Sr. | F16C 11/02 |
| | | | 411/338 |

(Continued)

FOREIGN PATENT DOCUMENTS

| CN | 115009136 A | 9/2022 |
|---|---|---|
| CN | 115257943 A | 11/2022 |

(Continued)

OTHER PUBLICATIONS

Written Opinion and International Search Report for Int'l. Patent Appln. No. PCT/US2023/076832, mailed Feb. 14, 2024 (12 pgs).

*Primary Examiner* — Laura Freedman

(57) ABSTRACT

A rollover protection structure (ROPS) for a work machine includes a rigid strut having a fixed longitudinal length. On one end of the strut, a pivot end mechanism is attached that has a mounting plate that pivots relative to the strut. On the opposite end of the strut, a jack end mechanism is attached that has a mounting plate that extends longitudinally relative to the strut. When installed, e.g., with the mounting plate on each end of the strut being affixed to the work machine such as by welding, the ROPS can be extended to span an opening in the chassis of the work machine and to impart specific compression/tension on the strut. Moreover, the jack end mechanism can be disassembled, while its mounting plate remains affixed to the work machine, and the strut can be rotated about an axis in pivot end mechanism about which the mounting plate therein pivots.

20 Claims, 9 Drawing Sheets

(56) References Cited

U.S. PATENT DOCUMENTS

| | | | | |
|---|---|---|---|---|
| 5,529,325 A * | 6/1996 | Glog | ............................ | B62J 1/16 |
| | | | | 224/430 |
| 5,584,363 A * | 12/1996 | Curtin | ........................ | B66B 9/16 |
| | | | | 187/242 |
| 5,732,969 A * | 3/1998 | Spoto | ...................... | B60G 21/05 |
| | | | | 280/124.106 |
| 6,099,004 A * | 8/2000 | Lin | ........................ | B60G 13/003 |
| | | | | 280/124.152 |
| 6,158,525 A * | 12/2000 | Inoue | ...................... | E02F 9/0816 |
| | | | | 172/776 |
| 6,416,067 B1 * | 7/2002 | Kugler | .................... | B60G 7/003 |
| | | | | 280/104 |
| 7,387,313 B2 | 6/2008 | Beki | | |
| 7,513,515 B1 * | 4/2009 | Ortiz | ...................... | B62D 25/082 |
| | | | | 280/124.152 |
| 7,568,732 B2 * | 8/2009 | Schlup, Jr. | ............ | B60R 21/131 |
| | | | | 280/756 |
| 7,896,429 B2 * | 3/2011 | Kim | ......................... | E02F 9/163 |
| | | | | 296/193.07 |
| 7,922,201 B2 | 4/2011 | Kürten et al. | | |
| 7,971,905 B2 | 7/2011 | McCord et al. | | |
| 8,544,939 B2 | 10/2013 | Klein et al. | | |
| 8,794,358 B2 * | 8/2014 | Hansen | ................... | B62D 55/10 |
| | | | | 180/9.26 |
| 9,150,182 B1 * | 10/2015 | Schlangen | ................ | B60G 3/20 |
| 9,266,490 B2 * | 2/2016 | Johnson | ................. | B60R 21/13 |
| 9,474,206 B2 * | 10/2016 | Garton | ................... | A01D 41/00 |
| 10,843,649 B2 * | 11/2020 | Sheets | ..................... | B60R 21/11 |
| 11,059,443 B2 * | 7/2021 | Davis | ..................... | B62D 27/06 |
| 11,259,453 B2 | 3/2022 | Kelly et al. | | |
| 2009/0038132 A1 * | 2/2009 | Zachary | ................ | B25B 27/306 |
| | | | | 29/225 |
| 2015/0321711 A1 | 11/2015 | Vik et al. | | |
| 2016/0107703 A1 | 4/2016 | Briceno et al. | | |
| 2018/0223503 A1 * | 8/2018 | Imano | ..................... | H04N 5/28 |

FOREIGN PATENT DOCUMENTS

| | | |
|---|---|---|
| EP | 1197399 A2 | 4/2002 |
| KR | 102062178 B1 | 1/2020 |
| WO | WO-2021161932 A1 * | 8/2021 |

* cited by examiner

ROLLOVER PROTECTION STRUCTURE

TECHNICAL FIELD

The present disclosure relates to vehicular rollover protection structures (ROPSs) and more particularly to ROPSs that are installed in structure that is removed from the surrounds of an operator cab.

BACKGROUND

Rollover protection structures that limit harm to vehicle operators are not just critical safety features for most automobiles but, in some contexts, they are also mandatory. Roll bars and cages are well known example ROPSs that are deployed over and/or around an operator cab. European Patent Application EP 1 197 399 A2 describes one such example—a roll bar for the protection of a riding lawn mower operator. The roll bar is foldable, but when engaged in its fully upright position, acts as other roll bars in protecting a vehicle operator by absorbing the energy that would otherwise be imparted on the operator.

In certain machines, such as large mining vehicles, deformation owing to a rollover incident may occur in structure other than around the cab and may also pose a threat to the operator. FIG. 1 is an illustration of a ROPS 10 that prevents a pair of chassis uprights 11a and 11b on either side of a chassis opening 7 of chassis 5 from deformation during a rollover incident, where such deformation may be dangerous to a machine operator in an attached operator cab. Chassis opening 7 may be required to access system components and is therefore void of permanent structure. Accordingly, ROPS 10 may be selectively detachable to afford access to such system components. As illustrated in FIG. 1, ROPS 10 includes a strut 24 having an end plate 22 on each end that may be attached to a frame plate 9 by a set of bolts, representatively illustrated at bolt 26, that retains ROPS 10 within chassis opening 7.

Work machine chassis 5, when fully populated with vehicle components, contorts during both work and vehicular maintenance tasks imposing alternating forces, e.g., compression/tension, clockwise/counterclockwise torsion, etc., on ROPS 10. Under these dynamic forces, one or more bolts 26 that retain ROPS 10 on work machine chassis 5 may crack or even break thereby diminishing the effectiveness of ROPS 10 as an operator-protecting structure. For these and other reasons, engineering efforts devoted to ROPS s that can be displaced, such as for access to otherwise obstructed components, are ongoing.

SUMMARY

In one aspect of the concept disclosed herein, rollover protection structure (ROPS) for a work machine includes a rigid strut of a fixed longitudinal length. At one end of the strut, a pivot end mechanism may be affixed that includes a pivot end mounting plate that pivots relative to the strut. At the other end of the strut, a jack end mechanism may be affixed that includes a jack end mounting plate that extends longitudinally relative to the strut.

In another aspect of the concept disclosed herein, a ROPS for a vehicle includes a rigid strut of fixed longitudinal length that corresponds to a dimension of an opening in a chassis of the vehicle. A pivot end mechanism may be mechanically interposed between the vehicle and the strut that includes a pivot end mounting plate that pivots relative to the strut. A jack end mechanism may be mechanically interposed between the vehicle and the opposite end of the strut that includes a jack end mounting plate that extends longitudinally relative to the strut.

In yet another aspect of the concept disclosed herein, a work machine having a chassis on which an operator cab is constructed includes a ROPS having a rigid strut of a fixed longitudinal length. A pivot end mechanism may be affixed to one end of the strut and includes a mounting plate that pivots relative to the strut. A jack end mechanism may be affixed to an opposite end of the strut and includes another mounting plate that extends longitudinally relative to the strut. A frame plate may interconnect the chassis with the mounting plate of the pivot end mechanism and another frame plate may interconnect the chassis with the other mounting plate of the jack end mechanism.

DETAILED DESCRIPTION

Figure 1:
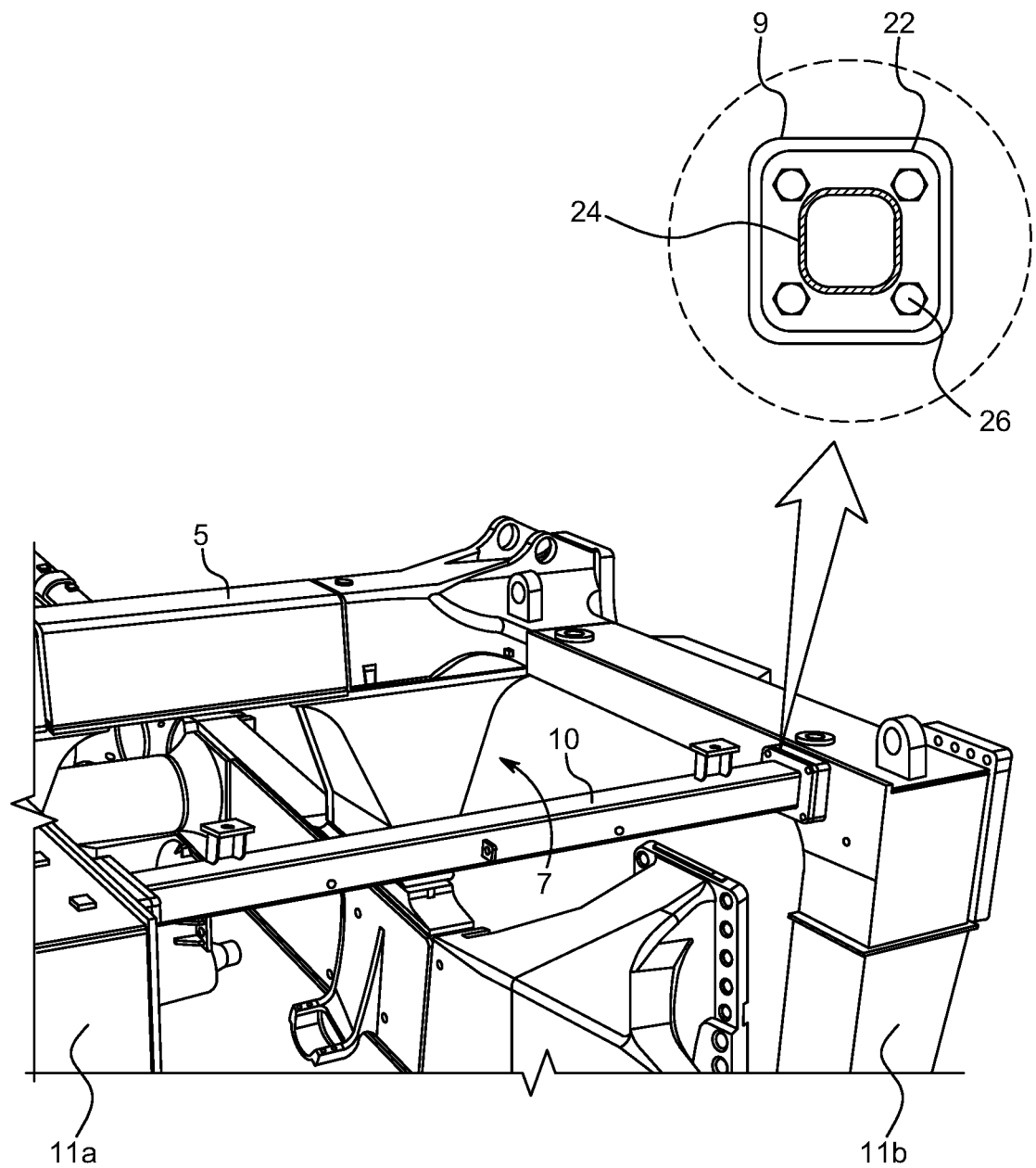
FIG. 1 is an illustration of a rollover protection structure (ROPS) related by purpose to the concept described by the present disclosure.

The concept disclosed herein is best described through certain embodiments thereof, which are described in detail herein with reference to the accompanying drawings, wherein like reference numerals refer to like features throughout. It is to be understood that the concept described herein is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The techniques described herein are directed to rollover protection structures that protect vehicle operators in a vehicular rollover incident. While the descriptions herein are based on exemplary embodiments for large mining vehicles, ordinarily skilled artisans will recognize and appreciate other ROPS contexts in which the present concept can be practiced.

Figure 2:
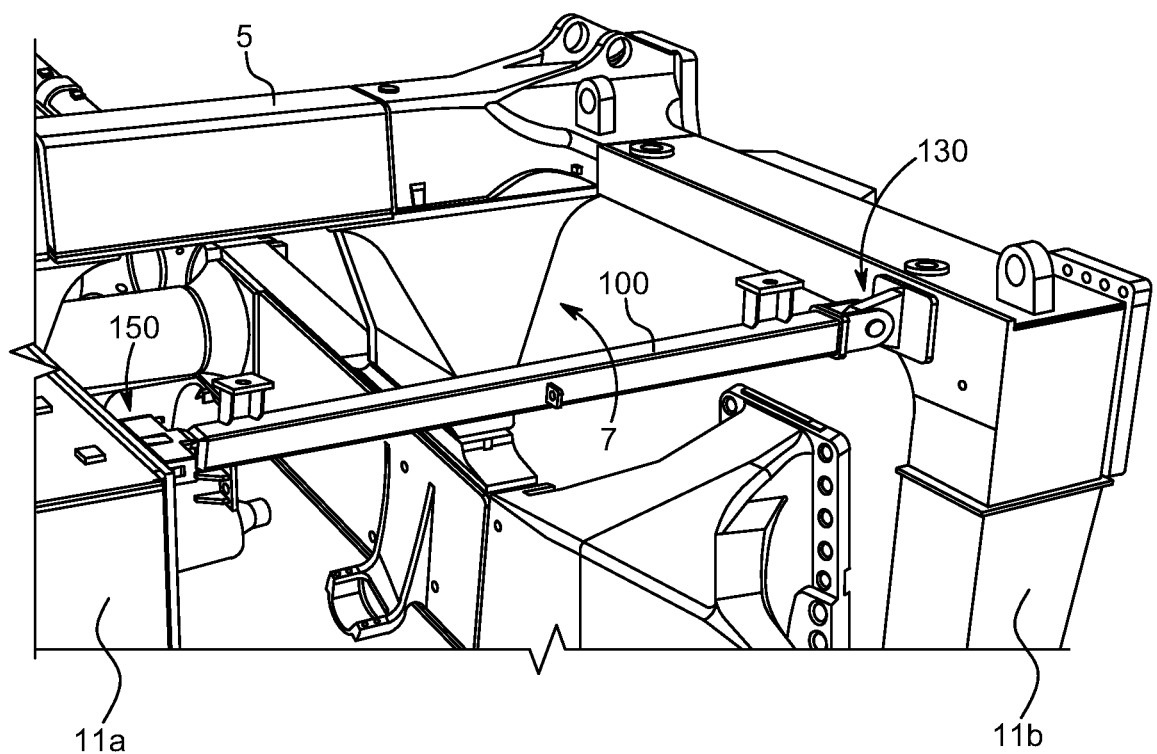
FIG. 2 is an illustration of an installed ROPS by which the concept described by the present disclosure can be embodied.

FIG. 2 is an illustration depicting an exemplary ROPS 100 embodying the present invention installed in a work machine chassis 5 of, for example, a large mining vehicle. ROPS 100 may be installed in chassis opening 7 between chassis uprights 11a and 11b and may comprise a pivot end 130 at one end thereof and a jack end 150 at the opposite end thereof. These and other features by which the concept described herein can be embodied are described in detail below. For purposes of the current discussion, it is sufficient to note that the overall length of ROPS 100 may be variable, and ROPS 100 may be installed according to a specification via the variable length feature. As one example, a requirement may be made for ROPS 100 to be loaded to a specified compression/tension, which may be achieved by varying the length of ROPS 100, once installed, until the specified force is measured, such as by a strain gauge (not illustrated).

Figure 3:
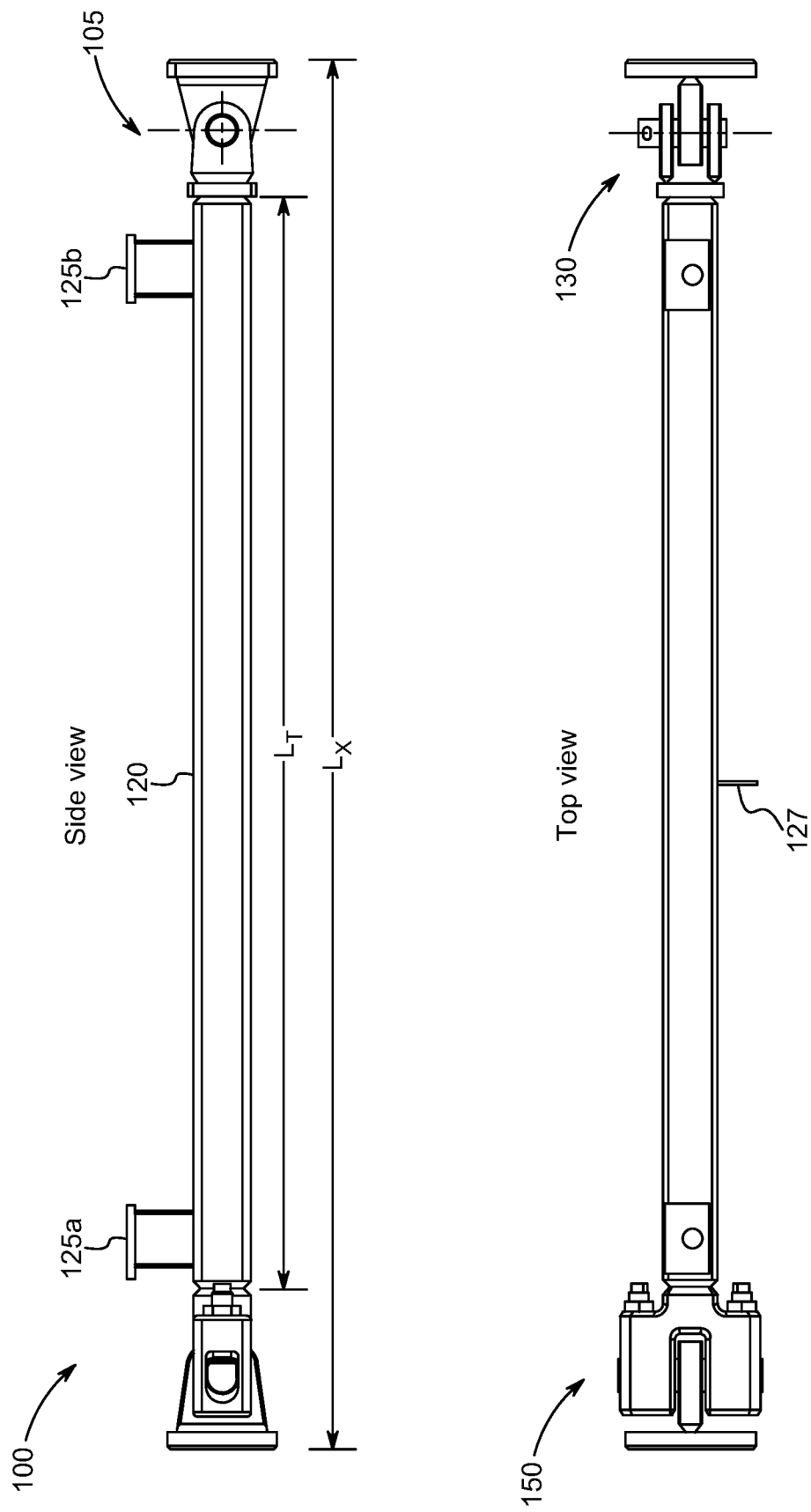
FIG. 3 is an illustration of a ROPS by which the concept described by the present disclosure can be embodied.

FIG. 3 is an illustration of ROPS 100 by which the concept described herein can be embodied in both top and side views. For purposes of this description, the "longitudinal" axis or dimension is that along its length Lx and the "transverse" axis or direction is that orthogonal to the longitudinal axis and across the top of ROPS 100 depicted in the lower panel of the figure. The transverse axis may be understood as being directed out of the drawing sheet in the side view depicted in the upper panel of the figure.

As is illustrated in FIG. 3, ROPS 100 may include a rigid strut 120 of fixed length LT on which jack end mechanism 150 and pivot end mechanism 130 are rigidly attached at respective ends thereof. Strut 120 may be fabricated from metal bar material, such as a steel tube. In the illustrated embodiment, strut 120 may have a quadrilateral cross-section, such as square.

As is described in detail below, the length Lx of ROPS 100 may be made variable by way of jack end mechanism 150. Additionally, ROPS 100 may be made displaceable by way of pivot end 130, where such displaceability is accomplished without removal of ROPS 100 from the work machine in which it is installed. Accordingly, jack end mechanism 150 may implement features by which ROPS 100 is released from the work machine at that end of the ROPS. Once released at jack end mechanism 150, ROPS 100 may be rotated about rotational axis 105 implemented by pivot end mechanism 130.

ROPS 100 may have features that are less for safety purposes than they are for vehicle assembly purposes. For example, ROPS 100 may have a pair of platform mounts 125a and 125b to which a vehicle component may be coupled and a lines routing tab 127 against which vehicular electrical and fluid lines may be secured. It is to be understood that such mechanical features may vary by vehicle assembly and are not essential to practicing the concept described herein.

Figure 4A:
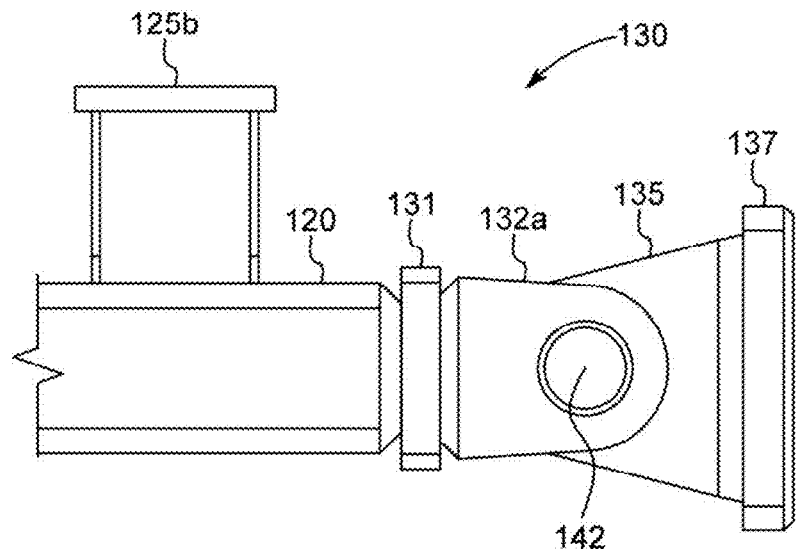
FIGS. 4A and 4B are illustrations of a pivot end of a ROPS, respectively, embodying the concept described by the present disclosure.
Figure 4B:
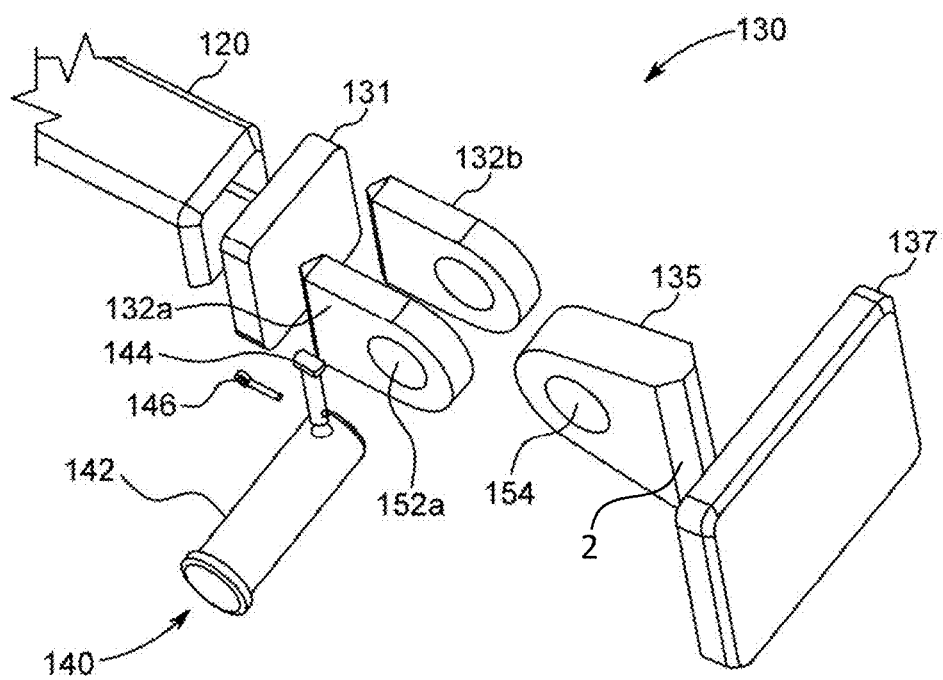

FIGS. 4A and 4B are illustrations of a pivot end of a ROPS, respectively, embodying the present concept, where the lower panel is an exploded view of pivot end mechanism 130 shown in side view in the upper panel. Pivot end mechanism 130 may be attached to work machine chassis 5 via a frame plate 137 to which, on the opposite side thereof, a mounting plate 135 is rigidly attached. Mounting plate 135 may have a mounting plate bore 138 formed therethrough to cooperate in a pivot structure described more fully below.

Throughout the figures of this patent application, certain components are illustrated as having chamfers or beveled edges, such as that illustrated at component edge 2, that may serve as a backing for a weld. It can be assumed that beveled edges illustrated in a manner of component edge 2 are weld targets and that in a fully fabricated ROPS 100 those edges are obstructed by the welds they are constructed to support. It is to be understood, however, that components by which the present concept described herein may be joined by techniques other than by welding. Industrial adhesives may be used, for example, and/or other structural joining techniques that can withstand the forces imparted on ROPS 100 and thus maintain the structural integrity thereof as an operator protection device.

Returning now to FIGS. 4A and 4B, pivot end mechanism 130 may be rigidly attached to strut 120 via a mounting plate 131 to which, on the opposite side thereof, a pair of pivot mounts 132a and 132b may be rigidly attached. Pivot mounts 132a and 132b may have respective pivot pin bores 136a and 136b formed therethrough to cooperate in the pivot structure mentioned above. That is, pivot mounts 132a and 132b may be spaced apart on mounting plate 131 to receive mounting plate 135 therebetween. Mounting plate 135 and pivot mounts 132a and 132b may be mutually sized so that mounting plate bore 138 aligns with pivot pin bores 136a and 136b with sufficient longitudinal spacing to afford the rotational freedom by which ROPS 100 can be displaced for access to otherwise obstructed components of the work machine in which it is installed. Displaceability of exemplary ROPS 100 is discussed further below.

With mounting plate bore 138 axially aligned with pivot pin bores 136a and 136b, a pin assembly 140 may be received therein to complete the pivot structure. That is, pivot pin 142 may be installed in the aligned mounting plate bore 138 and pivot pin bores 132a and 132b and retained therein by, for example, retaining pin 144 which itself may be retained in pivot pin 142 by a retaining pin 146. Pivot pin 142 may extend along the transverse axis to implement rotational axis 105 illustrated in FIG. 3.

Figure 5A:
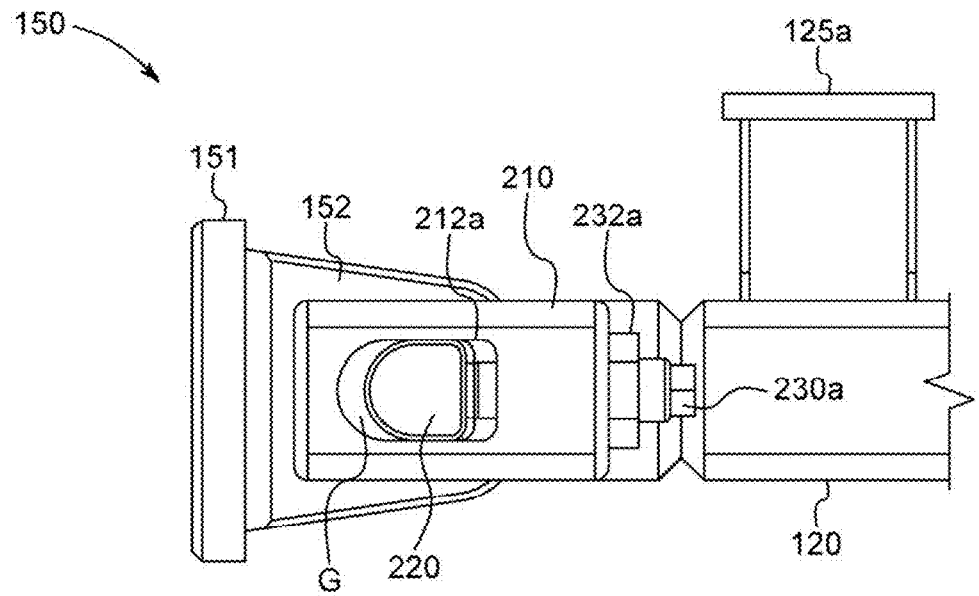
FIGS. 5A and 5B are illustrations of a jack end of a ROPS, respectively, embodying the concept described by the present disclosure.
Figure 5B:
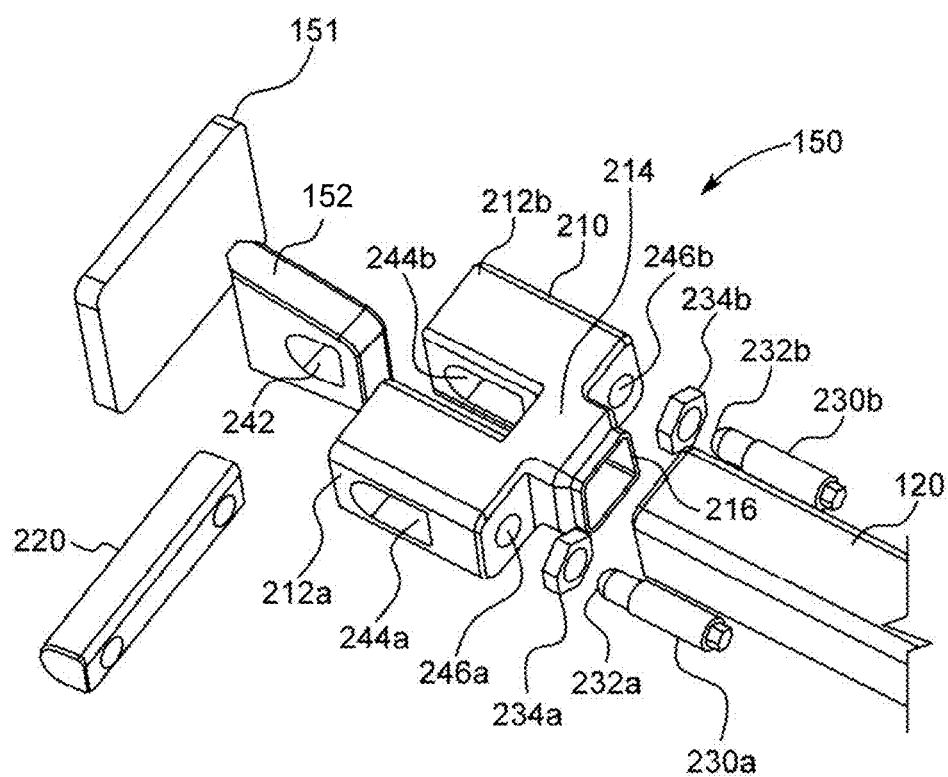

FIGS. 5A and 5B are illustrations of a jack end of a ROPS, respectively, embodying the concept described herein, where the lower panel is an exploded view of jack end mechanism 150 shown in side view in the upper panel. Jack end mechanism 150 may be attached to work machine chassis 5 via a frame plate 151 to which, on the opposite side thereof, a mounting plate 152 may be rigidly attached. Mounting plate 152 may have a bore, referred to herein as mounting plate D bore 242, formed therethrough having a D shape that is complementary to the cross-sectional profile of D pin 220 discussed further below. For purposes of the present discussion, it is sufficient to say that mounting plate D bore 242 may be shaped to prevent D pin 220 from twisting or otherwise rotating about the transverse axis when inserted therethrough.

Jack end mechanism 150 may be rigidly attached to the end of strut 120 opposite that to which pivot end mechanism 130 is attached by a weld or other rigid structural joint constructed between a clevis 210 and that end of strut 120. A clevis flange 216 may be received in a hollow end of strut 120, which may be a press fit to fortify the joint, and the interface between clevis 210 and strut 120 may be welded into a solid joint.

Clevis 210 may be a structurally unitary component comprising a clevis body 214 on one side of which a clevis flange 216 may be formed and on an opposite side thereof a pair of clevis projections 212a and 212b may extend. Clevis projections 212a and 212b may have D pin slots 244a and 244b extending therethrough along the transverse axis to be in communication with a clevis slot 217 formed between clevis projections 212a and 212b. Clevis body 214 may have a pair of threaded jack screw bores 246a and 246b formed therein extending along the longitudinal axis to be in communication with D pin slots 244a and 244b. A pair of jack screws 230a and 230b may be threadedly received in respective jack screw bores 246a and 246b and in respective lock nuts 234a and 234b. Mounting plate 152 may be received in clevis slot 217 and D pin bore 242 may be aligned along the transverse axis with the pair of D pin slots 244a and 244b. D pin 220 may be inserted through the aligned D pin bore 242 and D pin slots 244a and 244b with planar face 225 of D pin 220 keyed to a linear bore segment 243 of mounting plate D bore 242. In this arrangement, planar D pin face 225 faces clevis body 214 along the longitudinal axis. Jack screws 230a and 230b may be actuated to extend into D pin slots 244a and 244b so that jack screw tips 232a and 232b engage with respective D pin depressions 222a and 222b aligned in D pin slots 244a and 244b along the longitudinal axis.

Figure 6:
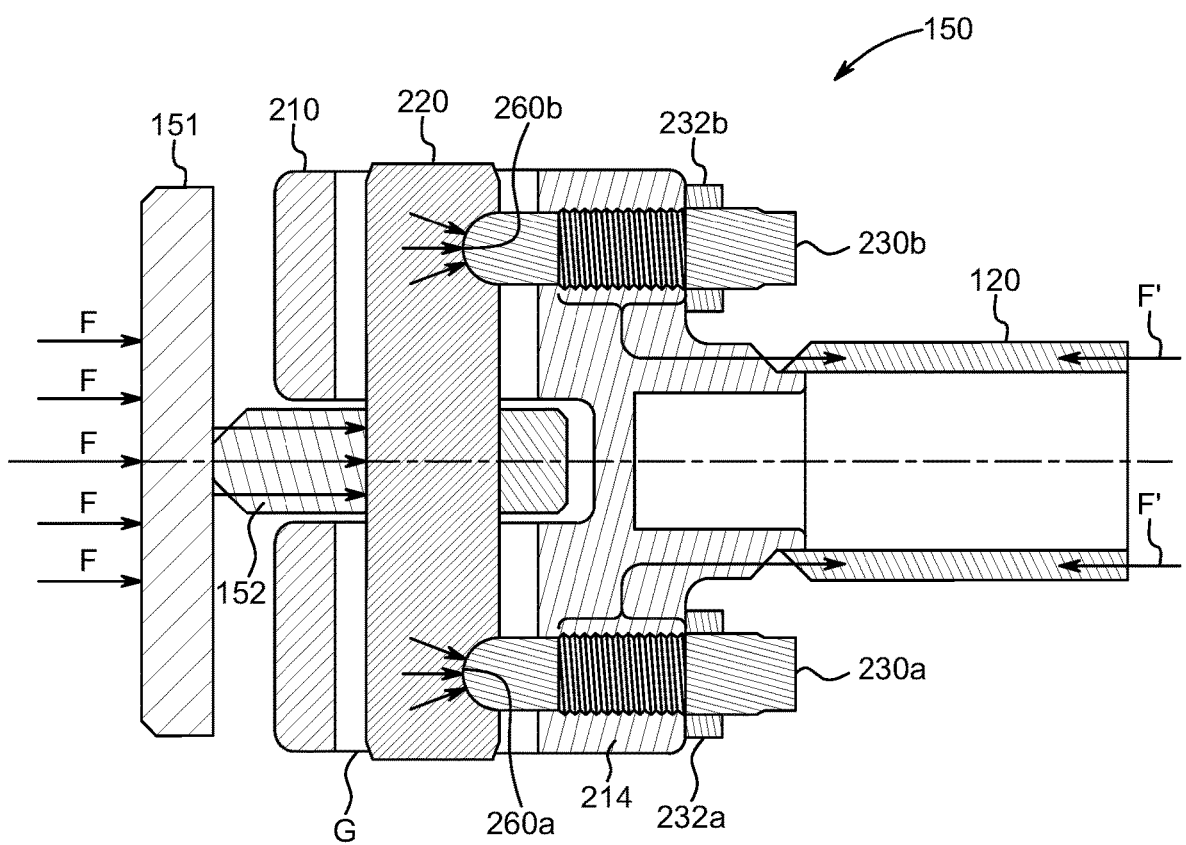
FIG. 6 is a cross-sectional illustration of the jack end illustrated in FIG. 5.

FIG. 6 is a cross-sectional illustration of the jack end illustrated in FIGS. 5A and 5B in which jack end mechanism 150 is rigidly attached to strut 120 (welds or alternative joining type not illustrated) and ROPS 100 is under compression. For example, ROPS 100 may be rigidly installed on work machine chassis 5 and jack screws 130a and 130b may be actuated to impart a force F on D pin 220 which is transferred to mounting plate 152, frame plate 151 and then to work machine chassis 5 (not illustrated in FIG. 6). Similar forces, which are depicted as directed force lines F' in FIG. 6, may be imparted on pivot end mechanism 130. When a specified level of compression is achieved, as might be measured by a strain gauge or similar measuring device, lock nuts 232a and 232b may be engaged against clevis body 214 to retain jack screws 230a and 230b in place.

Embodiments of the concept described herein may be constructed so that forces F are transferred around clevis projections 212a and 212b, which circumvents a potential mode of failure. Instead, forces F are transferred to D pin 220 through mounting plate 152 and to clevis body 214 through the threads of jack screws 230a and 230b. Indeed, D pin slots 244a and 244b are elongated leaving a gap G between D pin slots 244a and 244b and D pin 220 while ROPS 100 is under compression/tension (gap G is also depicted in the side view of ROPS 100 in FIG. 5). Additionally, jack screw tips 232a and 232b are shaped complementary to respective D pin depressions 222a and 222b and form respective interfaces 260a and 260d by which D pin 230 is captured within clevis 210.

Figure 7:
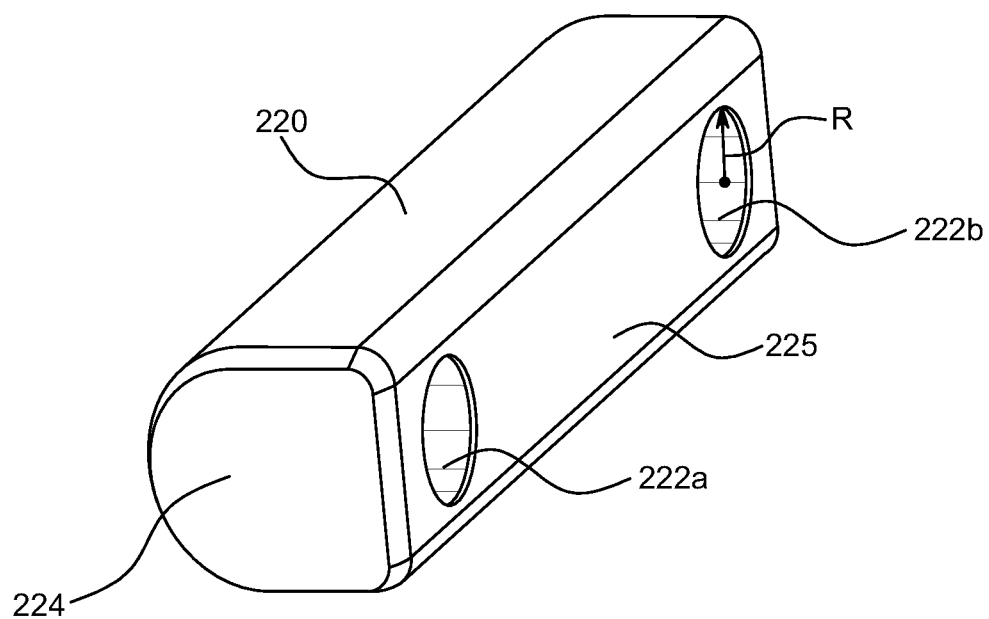
FIG. 7 is an illustration of a D pin that might be employed in an embodiment of the concept described by the present disclosure.
Figure 7:
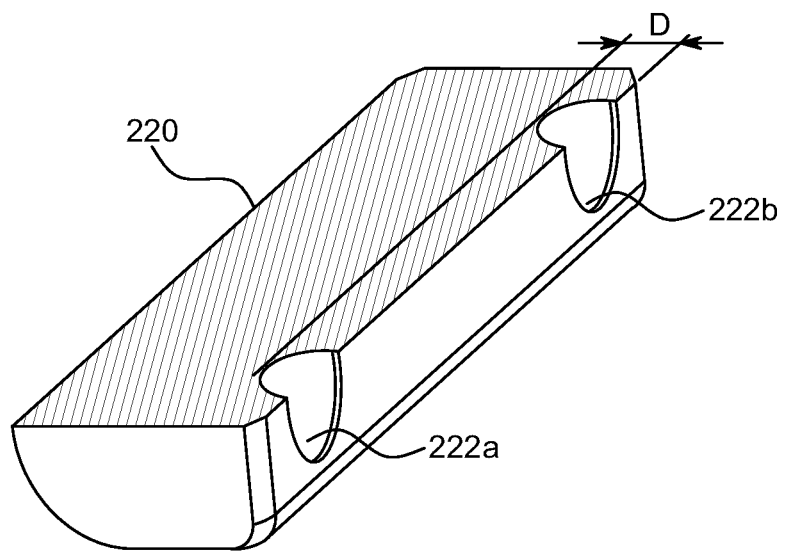

FIG. 7 is an illustration of a D pin 220 that might be employed in an embodiment of the concept described herein. D pin 220 may be fabricated from metal, such as high tensile steel, to have a D-shaped cross-sectional profile 224. D pin depressions 222a and 222b may be formed in planar D pin face 225 having positions and spacing that correspond with those of jack screws 230a and 230b in clevis 210. Each D pin depression 222a and 222b may have a radius R, as measured across planar D pin face 225, and a depth D as measured from planar D pin face 225. Radius R and depth D of D pin depressions 222a and 222b may correspond to complementary shapes of jack screw tips 232a and 232b; both may be hemispherical.

Figure 8:
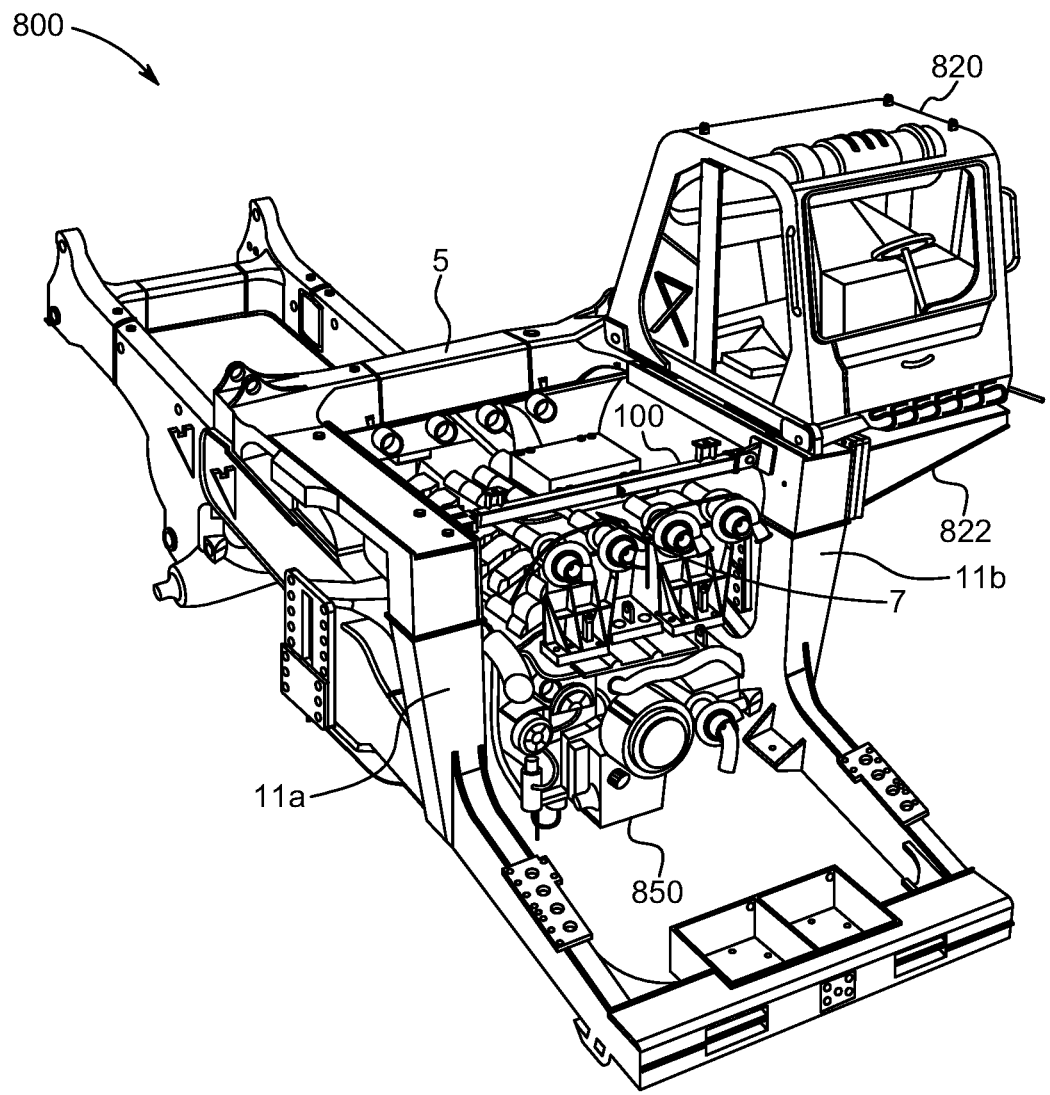
FIG. 8 is an illustration of a ROPS embodying the concept described by the present disclosure installed in a work machine.

FIG. 8 is an illustration of ROPS 100 embodying the concept described herein as installed in work machine chassis 5 of a work machine 800. As illustrated in the figure, chassis opening 7 in which ROPS 100 is installed may provide access to the machine's power plant 850 and, as such, chassis uprights 11a and 11b demark an open span in work machine chassis 5 that is adjacent to a cantilevered operator cab 820. Indeed, a cantilever 822 atop which operator cab 820 is installed may be rigidly attached to chassis upright 11b that directly borders the open span of chassis opening 7. Those having skill in the mechanical arts will appreciate that work machine chassis 5 will likely be designed to support the cantilevered operator cab 820 in the presence of the open span of work machine chassis opening 7. However, in a vehicle rollover, opening 7 may collapse on itself while cantilever 822 may fold away from chassis opening 7 putting tremendous stress on the joint constructed between cantilever 822 and chassis upright 11b (and any other cantilever hidden in the figure that support operator cab 820). In a rollover, the safest conditions for the operator in operator cab 820 would be for the operator to be retained in a seat by a harness that remains with the vehicle. In the absence of ROPS 100, there is a danger of operator cab 820 becoming separated from work machine chassis 5 in a rollover incident.

Figure 9:
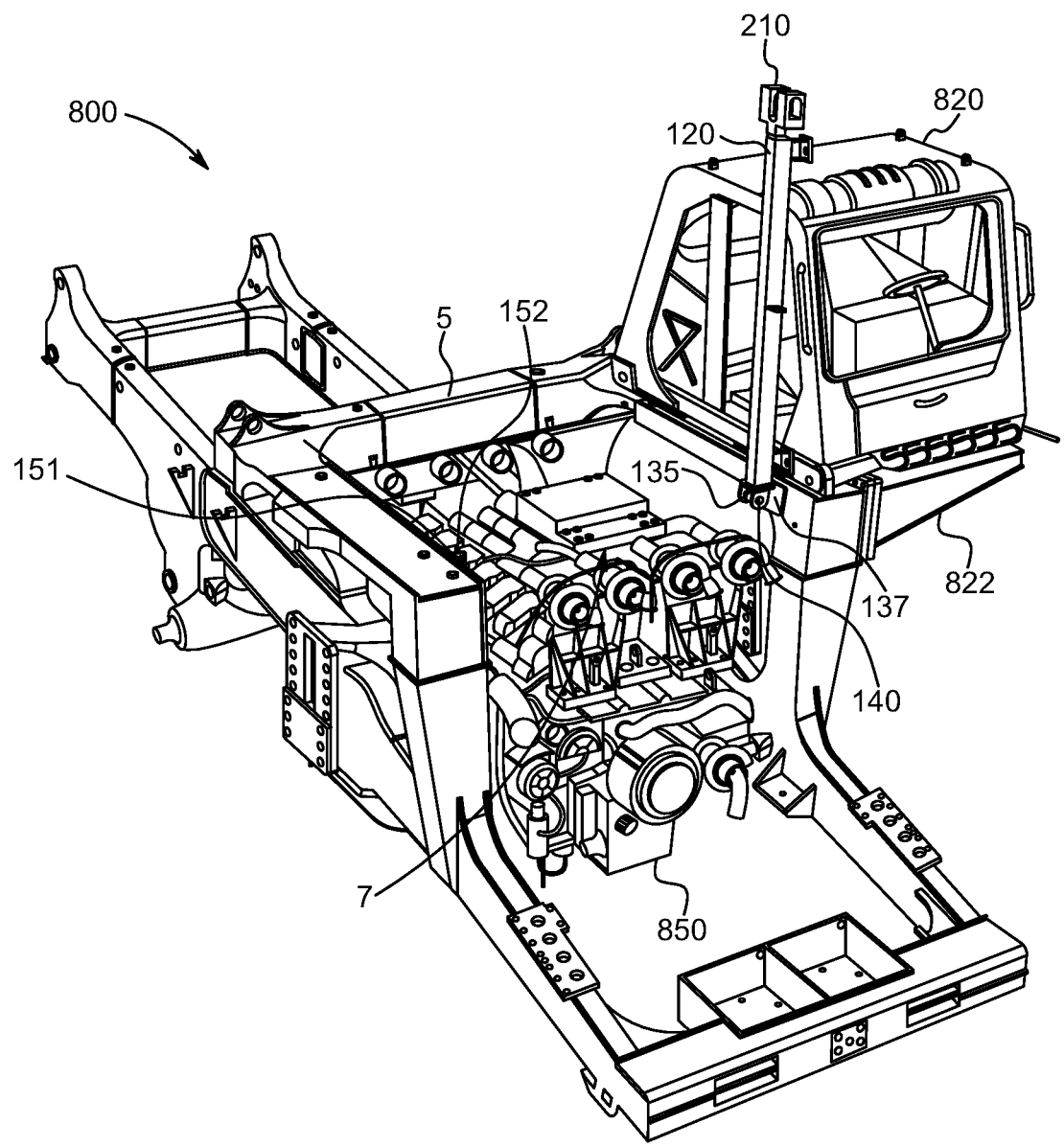
FIG. 9 is an illustration of ROPS embodying the concept described herein rotated away from otherwise obstructed components of a work machine.

FIG. 9 is an illustration of ROPS 100 embodying the concept described herein rotated away from otherwise obstructed components of a work machine 800, e.g., power plant 850. That is, in its engaged state illustrated in FIG. 8, chassis opening 7 providing access to power plant 850 is obstructed by ROPS 100, while in its open state illustrated in FIG. 9, chassis opening 7 is free of obstruction and power plant 850 is thus openly accessible.

Embodiments of the concept described herein may provide the rollover protection described above and provide access to work machine components that would otherwise be obstructed by that very rollover protection without disrupting any permanent joint in the structure. Referring once again to FIG. 5, disassembly of jack end mechanism, which affords the displacement of strut 120 from chassis opening 7, may begin by disengaging lock nuts 234a and 234b from clevis 210 to allow free rotation of jack screws 230a and 230b. Jack screws 230a and 230b may be actuated to relieve the compression/tension imparted in ROPS 100 as described with reference to FIG. 6, which is a beneficial feature of embodiments of the concept described herein. Jack screws 230a and 230b may be further actuated to disengage jack screw tips 232a and 232b from respective D pin depressions 222a and 222b until D pin 220 can be removed from clevis 210 and mounting plate 152. Once this is done, ROPS may be considered disengaged from work machine chassis 5 and can be displaced.

Returning to FIG. 9, strut 120 and clevis 210 attached thereto may rotate about an axis formed by pin assembly 140. It should be noted that access to power plant 850 is afforded by displacement of ROPS 100 while both frame plates 151 and 137 as well as both mounting plates 152 and 135 remain rigidly attached, e.g., welded, to work machine chassis 5.

INDUSTRIAL APPLICABILITY

Personnel safety is tantamount in any industrial setting, with each setting requiring different precautions for setting-specific dangers. Operating large machines, such as heavy construction machinery or large mining vehicles, can pose substantial hazard to those working on and around them. The concept described herein provides rollover protection for such vehicles and does so in a manner that allows for its displacement to access otherwise obstructed components of the machine.

The descriptions above are intended to illustrate possible implementations of the present concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the present concept should therefore be determined not with reference to the description above, but with reference to the appended claims, along with their full range of equivalents.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A rollover protection structure (ROPS) for a work machine comprising:
    a rigid strut of a fixed longitudinal length;
    a pivot end mechanism affixed to one end of the strut and comprising a pivot end mounting plate that pivots relative to the strut; and
    a jack end mechanism affixed to an opposite end of the strut and comprising a jack end mounting plate that is selectively extendable and retractable longitudinally relative to the strut.

2. The ROPS of claim 1, wherein the jack end mechanism comprises:
    a clevis affixed to the strut and comprising a clevis slot formed between a pair of clevis projections in which the jack end mounting plate is received.

3. The ROPS of claim 2, wherein the jack end mounting plate includes a bore formed therethrough having a peripheral shape.

4. The ROPS of claim 3, wherein the clevis includes a slotted bore in each of the clevis projections.

5. The ROPS of claim 4, wherein the jack end mechanism comprises a jack pin disposed in the bore of the jack end mounting plate and in the slotted bore of the clevis, the jack pin having a cross-sectional shape that is complementary to the peripheral shape of the bore in the jack end mounting plate.

6. The ROPS of claim 5, wherein the peripheral shape of the bore formed in the jack end mounting plate includes a linear segment.

7. The ROPS of claim 6, wherein the jack pin comprises a planar surface disposed thereacross that corresponds to the linear segment formed on the bore in the jack end mounting plate.

8. The ROPS of claim 7, wherein the jack pin includes a set of depressions formed on the planar surface thereof.

9. The ROPS of claim 8, wherein the jack end mechanism comprises a set of jack screws threadedly engaged with the clevis, each of the jack screws having a screw tip received in a corresponding one of the depressions on the jack pin.

10. The ROPS of claim 9, wherein the depressions on the jack pin and the screw tip on each of the jack screws are complementary hemispheres.

11. A rollover protection structure (ROPS) of a vehicle comprising:
    a rigid strut of fixed longitudinal length that corresponds to a dimension of an opening in a chassis of the vehicle;
    a pivot end mechanism mechanically interposed between the vehicle and the strut at a first end of the strut and comprising a pivot end mounting plate that pivots relative to the strut; and
    a jack end mechanism mechanically interposed between the vehicle and the strut at a second end of the strut opposite the first end associated with the pivot end mechanism and comprising a jack end mounting plate through which a user selectable force is applied longitudinally along the strut.

12. The ROPS of claim 11, wherein the jack end mechanism comprises:
    a clevis affixed to the strut and comprising a clevis slot formed between a pair of clevis projections in which the jack end mounting plate is received.

13. The ROPS of claim 12, wherein the jack end mounting plate includes a bore formed therethrough having a D peripheral shape.

14. The ROPS of claim 13, wherein the clevis includes a slotted bore in each of the clevis projections.

15. The ROPS of claim 14, wherein the jack end mechanism comprises a jack pin disposed in the bore of the jack end mounting plate and in the slotted bore of the clevis, the jack pin having a D cross-sectional shape that is complementary to the D peripheral shape of the bore in the jack end mounting plate.

16. The ROPS of claim 15, wherein the jack pin includes a set of depressions formed on a planar surface thereof.

17. The ROPS of claim 16, wherein the jack end mechanism comprises a set of jack screws threadedly engaged with the clevis, each of the jack screws having a screw tip received in a corresponding one of the depressions on the jack pin.

18. A work machine having a chassis on which an operator cab is constructed, the work machine comprising:
    a rollover protection structure (ROPS) including:

a rigid strut of a fixed longitudinal length, a pivot end mechanism affixed to one end of the strut and comprising a mounting plate that pivots relative to the strut, and a jack end mechanism affixed to an opposite end of the strut and comprising another mounting plate that extends longitudinally relative to the strut;

a frame plate interconnecting the chassis with the mounting plate of the pivot end mechanism; and another frame plate interconnecting the chassis with the other mounting plate of the jack end mechanism, wherein the jack end mechanism is constructed to adjust a force on the frame plate and the other frame plate.

19. The work machine of claim 18, wherein the jack end mechanism comprises:

a clevis affixed to the strut and comprising a clevis slot formed between a pair of clevis projections in which the jack end mounting plate is received, the clevis including a slotted bore in each of the clevis projections that are in communication with respective threaded jack screw bores formed in a clevis body from which the clevis projections extend;

a jack pin disposed in the bore of the jack end mounting plate and in the slotted bore of the clevis; and a set of jack screws threadedly engaged in the jack screw bores, the jack screws having a screw tip received in respective depressions formed on the jack pin.

20. The work machine of claim 19, wherein the depressions on the jack pin are complementary in shape to that of the screw tips and are hemispherical.

* * * * *